United States Patent
Kim et al.

(10) Patent No.: US 11,739,457 B2
(45) Date of Patent: Aug. 29, 2023

(54) LAUNDRY TREATMENT MACHINE AND METHOD FOR CONTROLLING THE SAME

(71) Applicant: LG ELECTRONICS INC., Seoul (KR)

(72) Inventors: Junsung Kim, Seoul (KR); Kiwook Lee, Seoul (KR); Jongseok Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 17/258,063

(22) PCT Filed: Jul. 5, 2019

(86) PCT No.: PCT/KR2019/008292
§ 371 (c)(1),
(2) Date: Jan. 5, 2021

(87) PCT Pub. No.: WO2020/009533
PCT Pub. Date: Jan. 9, 2020

(65) Prior Publication Data
US 2021/0207305 A1    Jul. 8, 2021

(30) Foreign Application Priority Data
Jul. 6, 2018 (KR) .......... 10-2018-0079053

(51) Int. Cl.
*D06F 33/42* (2020.01)
*D06F 34/10* (2020.01)
(Continued)

(52) U.S. Cl.
CPC .............. *D06F 33/42* (2020.02); *D06F 34/10* (2020.02); *D06F 39/08* (2013.01); *D06F 39/083* (2013.01); *D06F 37/36* (2013.01)

(58) Field of Classification Search
CPC .......... D06F 33/42; D06F 33/10; D06F 34/10; D06F 39/083
See application file for complete search history.

(56) References Cited

U.S. PATENT DOCUMENTS

| | | | |
|---|---|---|---|
| 2004/0078902 A1* | 4/2004 | McGill | ................. D06F 39/085 68/12.02 |
| 2014/0041129 A1* | 2/2014 | Merkle | ................... D06F 33/00 68/12.14 |

(Continued)

FOREIGN PATENT DOCUMENTS

| | | |
|---|---|---|
| KR | 10-1999-0026926 A | 4/1999 |
| KR | 10-2011-0013172 A | 2/2011 |

(Continued)

OTHER PUBLICATIONS

Machine translation of KR 10-1756408, dated Jul. 2017. (Year: 2017).*

(Continued)

*Primary Examiner* — Michael E Barr
*Assistant Examiner* — Kevin G Lee
(74) *Attorney, Agent, or Firm* — KED & Associates LLP

(57) ABSTRACT

The present disclosure relates to a laundry treatment machine and a method for controlling the same. An increased amount of wash water during dewatering is introduced into a pump by decreasing the speed of a pump motor provided in the pump and increasing it again based on changes in the speed of the main motor during dewatering, and the wash water introduced while the speed of the pump motor is increasing is drained. Thus, the amount of noise generated during drainage may be reduced, drainage performance may be improved, and drainage time may be shortened.

15 Claims, 11 Drawing Sheets

(51) Int. Cl.
   *D06F 39/08* (2006.01)
   *D06F 37/36* (2006.01)

(56) References Cited

U.S. PATENT DOCUMENTS

2014/0310884 A1  10/2014  Kwon et al.
2019/0062982 A1  2/2019   Li et al.

FOREIGN PATENT DOCUMENTS

| KR | 10-2011-0112486 A | 10/2011 |
| KR | 10-2014-0124560 A | 10/2014 |
| KR | 10-1756408 | 7/2017 |
| WO | WO 2017/092534 A1 | 6/2017 |

OTHER PUBLICATIONS

International Search Report (with English Translation) and Written Opinion dated Oct. 29, 2019 issued in Application No. PCT/KR2019/008292.
Korean Office Action issued in Application No. 10-2018-0079053 dated Aug. 29, 2022.

* cited by examiner

LAUNDRY TREATMENT MACHINE AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2019/008292, filed Jul. 5, 2019, which claims priority to Korean Patent Application No. 10-2018-0079053, filed Jul. 6, 2018, whose entire disclosures are hereby incorporated by reference.

BACKGROUND OF THE DISCLOSURE

1. Field of the Disclosure

The present disclosure relates to a laundry treatment machine and a method for controlling the same, and more particularly, to a laundry treatment machine capable of reducing noise generated during drainage and a method for controlling the same.

2. Description of the Related Art

A laundry treatment machine includes a drain pump to discharge water to the outside. A drain pump driving apparatus drives a motor during drainage to discharge water introduced into a water introduction part to the outside.

In order to drive the drain pump, the motor is normally driven by a constant speed operation with an input AC voltage.

For example, when the frequency of the input AC voltage is 50 Hz, the drain pump motor rotates at 3,000 rpm, and, when the frequency of the input AC voltage is 60 Hz, the drain pump motor rotates at 3,600 rpm.

Japanese Laid-Open Patent Publication No. 2004-135491 discloses a configuration for controlling speed in response to a speed command in order to drive a motor.

The drain pump drains wash water contained in a washing tub after completion of a washing or rinsing operation. Also, the drain pump operates during dewatering, and drains wash water released from laundry in a dewatering process.

During dewatering, part of the wash water released from the laundry may rotate along with the washing tub. Particularly, when the main motor speeds up, part of the wash water remains in the washing tub without being drained due to a centrifugal force exerted on the inside of the washing tub.

Moreover, although the water level of the laundry increases due to the released wash water, the wash water is not introduced into the drain pump but remains in the washing tub, thus reducing drainage performance.

Particularly, in case in which the level of wash water is low or the wash water is not introduced into the drain pump, air enters the drain pump, along with the wash water, making the drain pump idle. When the drain pump idles, noise may be generated from the drain pump. The idling of the drain pump leads to problems such as increased noise and reduction in drainage performance.

Since the water level increases and decreases repeatedly during dewatering, it is necessary to prevent idling of the drain pump and improve drainage performance.

SUMMARY

The present disclosure provides a laundry treatment machine capable of reducing noise generated during drainage and a method for controlling the same.

The present disclosure also provides a laundry treatment machine capable of improving drainage performance and a method for controlling the same.

The present disclosure also provides a laundry treatment machine capable of reducing drainage time and a method for controlling the same.

The present disclosure also provides a laundry treatment machine with a drain pump that is driven in a sensorless manner and a method for controlling the same.

An embodiment of the present disclosure provides a laundry treatment machine including: a main motor to supply torque to a washing tub; a pump motor to operate a pump; a pump driving apparatus to drive the pump motor; and a main controller to control the pump driving apparatus to operate the pump based on the speed of the main motor during dewatering, wherein, when the main motor speeds up, the main controller controls the pump motor to decrease the speed and then increase the speed again.

When the main motor speeds up within a range between a first speed and a second speed greater than the first speed, the main controller controls the speed of the pump motor.

When the main motor speeds up, the pump motor is stopped and then the speed thereof is increased.

When the speed of the pump motor decreases and the increases again, the main controller allows the pump motor to speed up further.

Another embodiment of the present disclosure provides a laundry treatment machine including: a main motor to supply torque to the washing tub; a pump; a pump motor to operate the pump; a pump driving apparatus to drive the pump motor; and a main controller to control the pump driving apparatus to operate the pump based on the speed of the main motor during dewatering, wherein, when the level of wash water increases by speeding up the main motor, the main controller decreases the speed of the pump motor for a set period of time and then increases the same.

Another embodiment of the present disclosure provides a method for controlling a laundry treatment machine, the method comprising: draining wash water by a pump by driving a pump motor; dewatering the wash water contained in the laundry by rotating a main motor; in case in which the main motor speeds up during dewatering, decreasing the speed of the pump motor; increasing the speed by speeding up the pump motor; and draining the wash water introduced into the pump motor.

The speed of the pump motor decreases for a preset period of time during which the wash water is introduced into the pump.

ADVANTAGEOUS EFFECTS

A laundry treatment machine and a method for controlling the same according to an embodiment of the present disclosure may reduce noise generated by the operation of a pump by allowing the speed of a pump motor to go up or down based on the speed of the main motor during drainage.

Particularly, the present disclosure may minimize noise generated while the main motor is speeding up.

Moreover, the present disclosure may improve drainage performance by effectively draining wash water while the main motor is speeding up.

The present disclosure allows for smooth drainage as the pump further speeds up based on the speed of the main motor.

The present disclosure has the effect of reducing drainage time and washing time by improving drainage performance.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
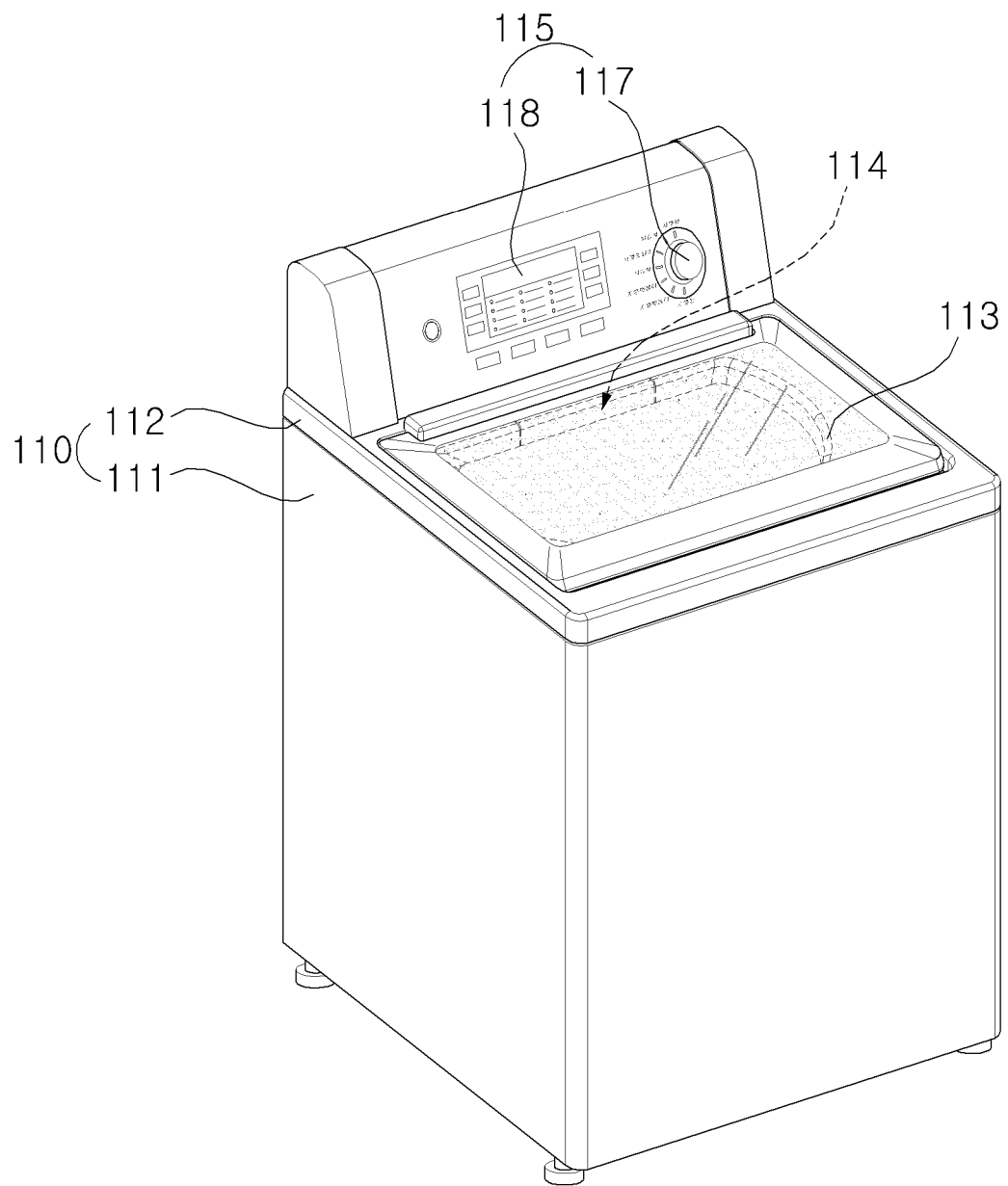
FIG. 1 is a perspective view illustrating a laundry treatment machine according to an embodiment of the present disclosure.
Figure 2:
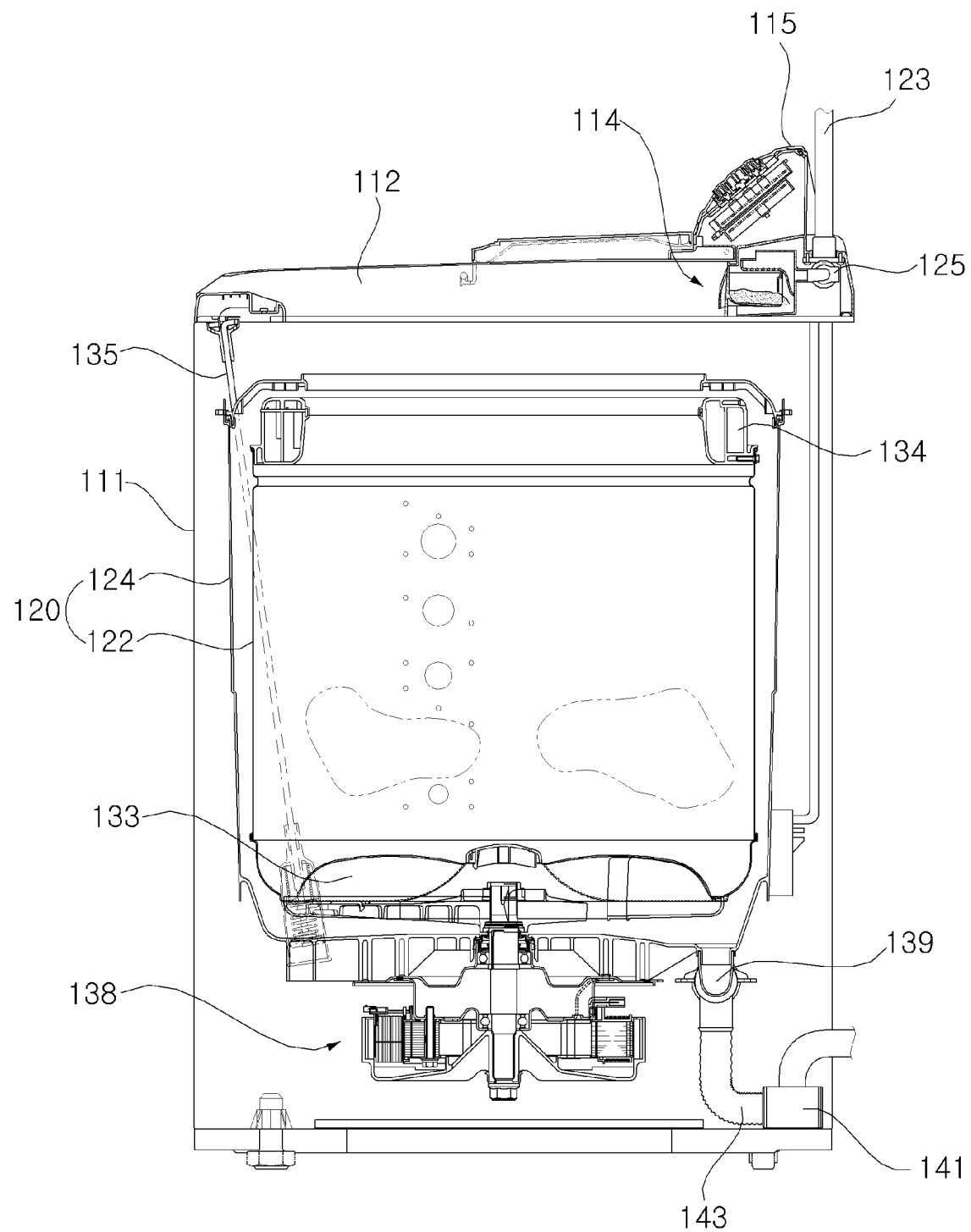
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
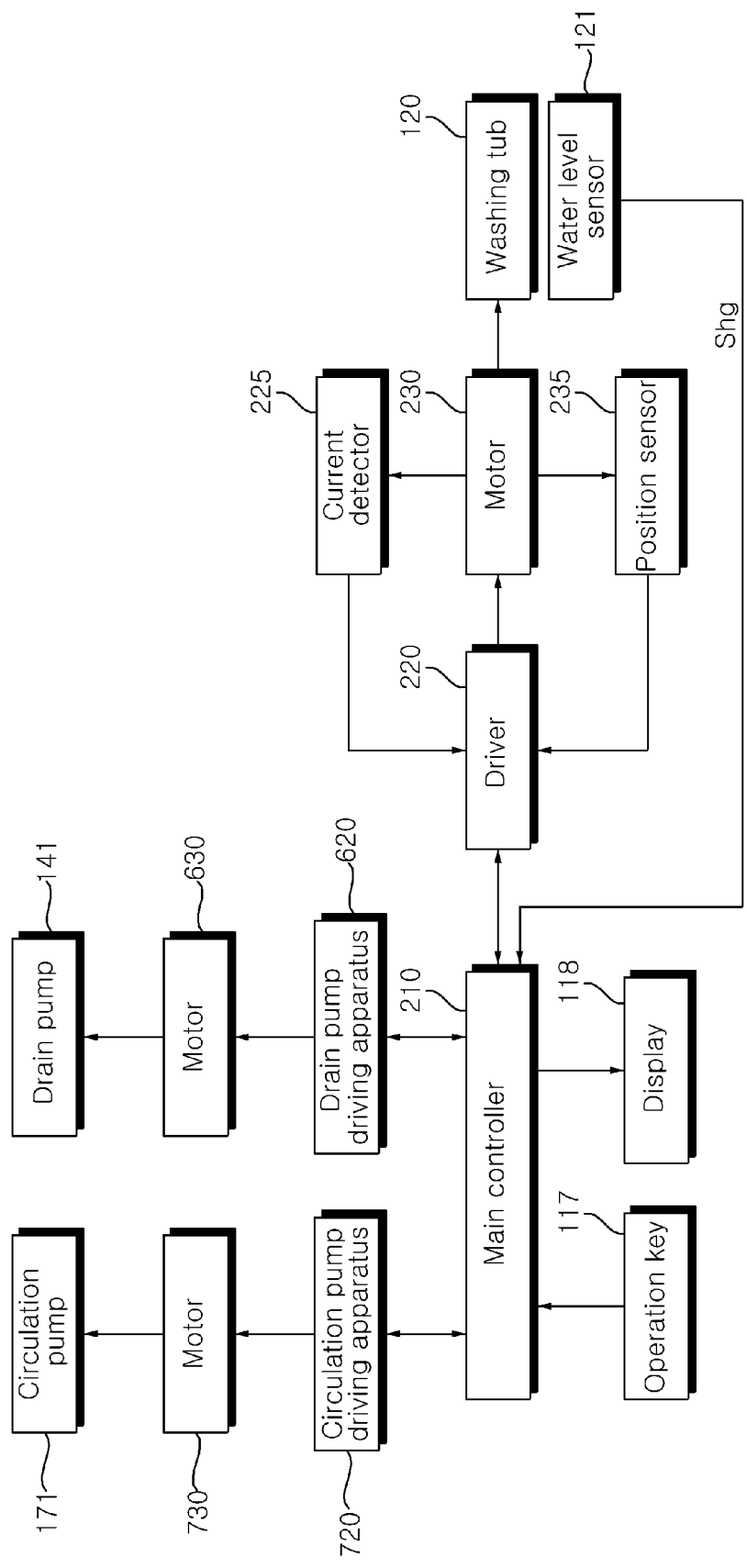
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a pump 141 for pumping the wash water may be provided.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry in the inner tub 122, the rotational speed of the inner tub 122 or the resonance characteristics of the inner tub 122 can be attenuated.

It should be noted that the present disclosure is described with respect to, but not limited to, a laundry treatment machine with a door formed on a top cover, and may be applied to a laundry treatment machine with a door formed on the front.

FIG. 3 is an internal block diagram of the laundry treatment machine of FIG. 1.

Referring to FIG. 3, in the laundry treatment machine 100, the driver 220 is controlled by the main controller 210, and the driver 220 drives the motor 230. Thereby, the washing tub 120 is rotated by the motor 230.

Meanwhile, the laundry treatment machine 100 may include a motor 630 for driving the pump 141 and a pump driving apparatus 620 for driving the motor 630. The pump driving apparatus 620 may be controlled by the main controller 210.

Also, the laundry treatment machine 100 may include a motor 730 for driving the circulation pump 171 and a circulation pump driving apparatus 720 for driving the motor 730. The circulation pump driving apparatus 720 may be controlled by the main controller 210.

In case in which necessary, the motor 230 for spinning the washing tub may be described as a main motor, the motor 630 for operating the drain pump may be described as a drain motor, and the motor 730 for operating the circulation pump may be described as a circulating motor.

In this specification, the pump driving apparatus 620 may be referred to as a pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the motor 230. For example, the main controller 210 may control the driver 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the motor 230, may include an inverter (not shown) and an inverter controller (not shown). In addition, the driver 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
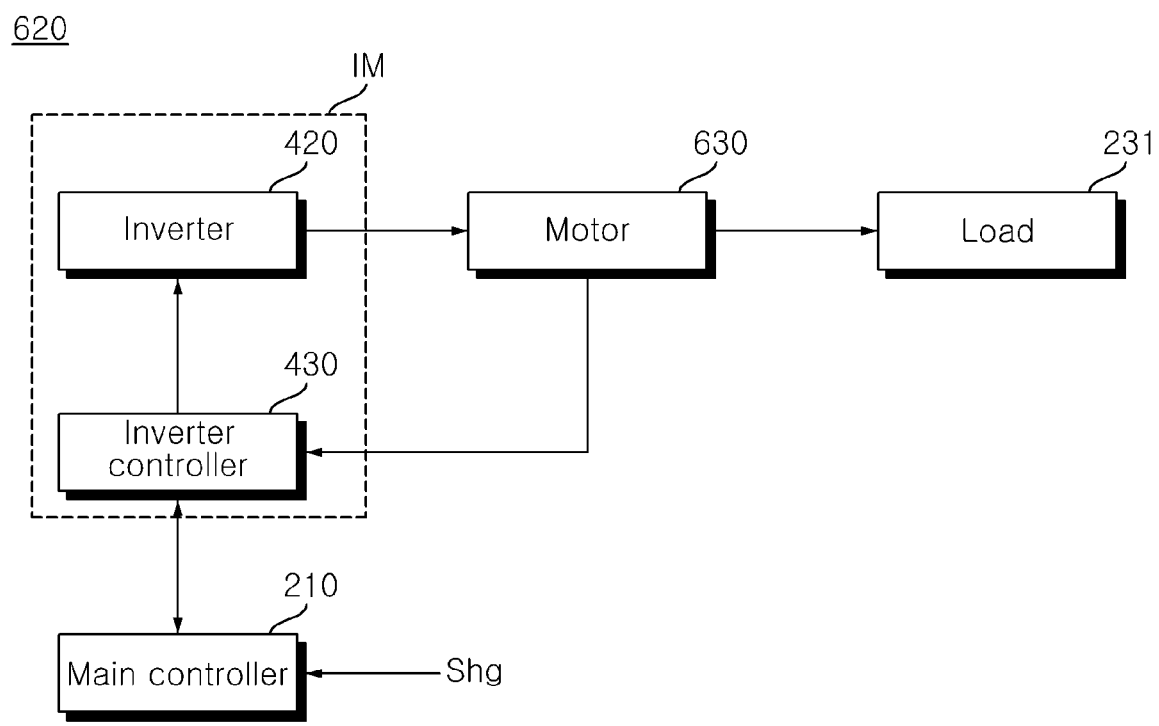
FIG. 4 illustrates an example of an internal block diagram of a pump driving apparatus of FIG. 1.
Figure 5:
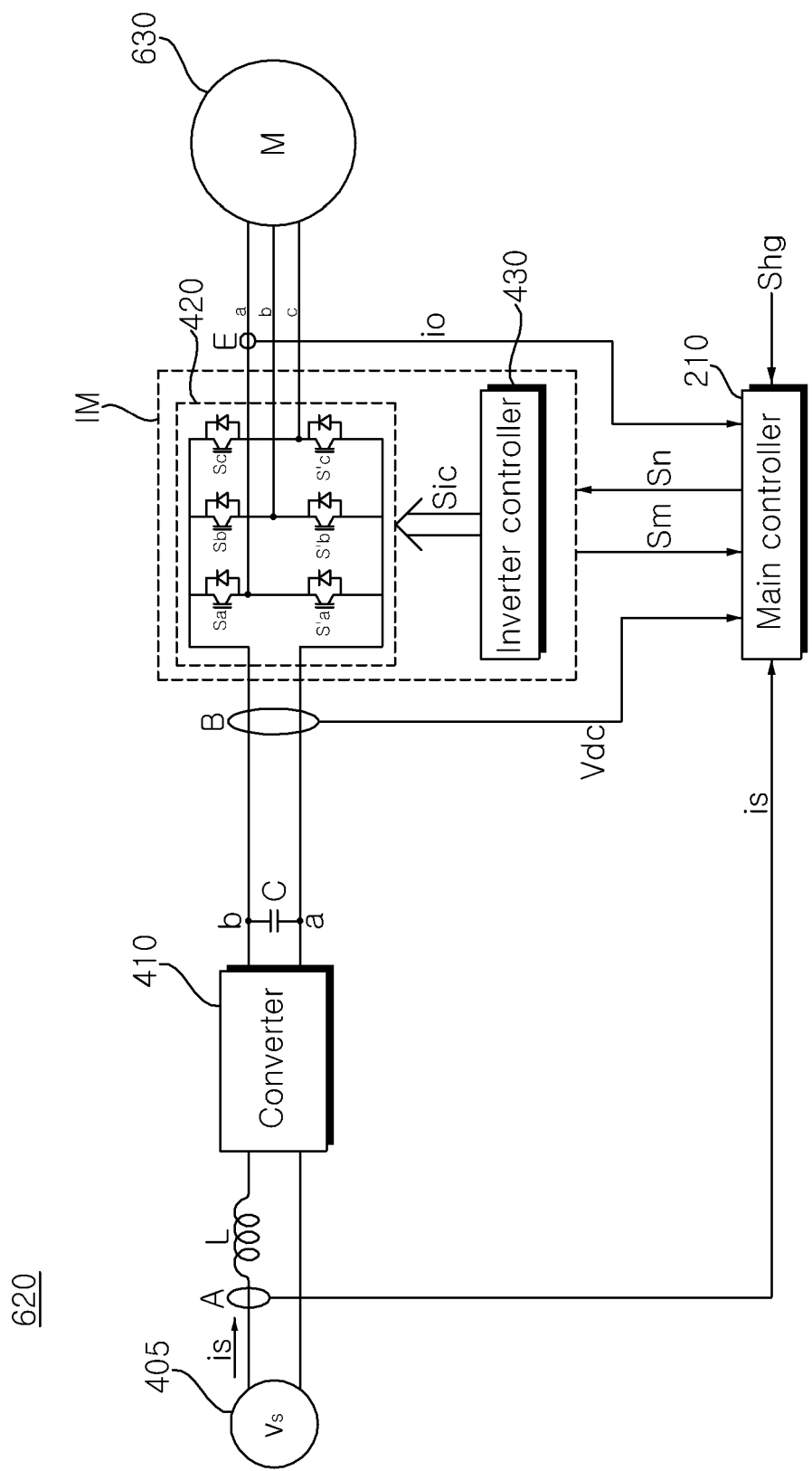
FIG. 5 illustrates an example of an internal circuit diagram of the pump driving apparatus of FIG. 4.

FIG. 4 illustrates an example of an internal block diagram of the pump driving apparatus of FIG. 1, and FIG. 5 illustrates an example of an internal circuit diagram of the pump driving apparatus of FIG. 4.

Referring to FIGS. 4 and 5, the pump driving apparatus 620 according to an embodiment of the present disclosure serves to drive the motor 630 in a sensorless manner, and may include an inverter 420, an inverter controller 430, and a main controller 210.

The main controller 210 and the inverter controller 430 may correspond to a controller and a second controller described in this specification, respectively.

The pump driving apparatus 620 according to an embodiment of the present disclosure may include a converter 410, a DC terminal voltage detector B, a DC terminal capacitor C, and an output current detector E. In addition, the pump driving apparatus 620 may further include an input current detector A and a reactor L.

The circulation pump 171 may be internally configured in the same manner as the drain pump, except for the hose connection, and operate on the same principle. A description of the configuration and operation of the circulation pump may be omitted below.

Hereinafter, an operation of each constituent unit in the drain pump driving apparatus 620 of FIGS. 4 and 5 will be described.

The reactor L is disposed between a commercial AC voltage source 405 (vs) and the converter 410, and performs a power factor correction operation or a boost operation. In addition, the reactor L may also function to limit a harmonic current resulting from high-speed switching of the converter 410.

The input current detector A may detect an input current is is input from the commercial AC voltage source 405. To this end, a current transformer (CT), a shunt resistor, or the like may be used as the input current detector A. The detected input current is is may be input to the inverter controller 430 or the main controller 210 as a discrete signal in the form of a pulse. In FIG. 5, it is illustrated that the detected input current is is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies based on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed voltage. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous motor 630.

For example, when the synchronous motor 630 is in a 3-phase type, the inverter 420 may convert the DC voltage Vdc into 3-phase AC voltages va, vb and vc and output the 3-phase AC voltages to the three-phase synchronous motor 630 as shown in FIG. 5.

As another example, when the synchronous motor 630 is in a single-phase type, the inverter 420 may convert the DC voltage Vdc into a single-phase AC voltage and output the single-phase AC voltage to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current idc detected by the output current detector E and a DC terminal voltage Vdc detected by the DC terminal voltage detector B.

The main controller 210 may calculate a power based on the output current idc and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current idc flowing in the 3-phase motor 630.

The output current E may be disposed between the DC terminal capacitor C and the inverter 420 to detect an output current idc flowing in the motor.

Particularly, the output current detector E may have one shunt resistance element Rs.

Meanwhile, the output current detector E may use one shunt resistance element Rs to detect phase current ia, ib, and ic, which is the output current idc flowing in the motor 630, when the lower arm switching element of the inverter 420 is turned on.

The detected output current idc may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC voltage at a predetermined frequency for each phase is applied to a coil of the stator for each phase (phase a, b or c).

Such a motor 630 may include a brushless DC (BLDC) motor.

The motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
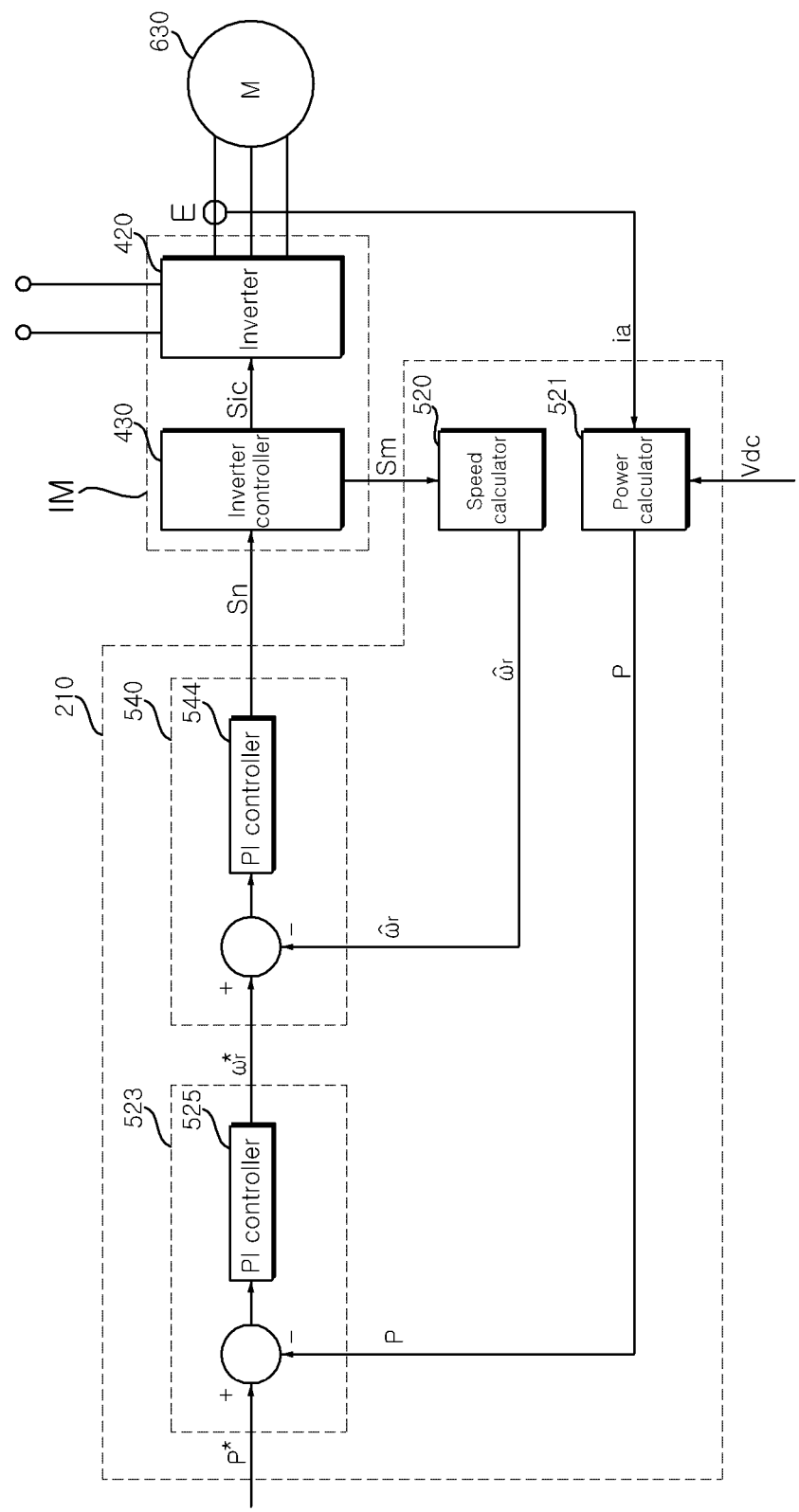
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the motor 630 received from the inverter controller 430.

Specifically, the speed calculator 520 may calculate a zero crossing for the voltage information Sm of the motor 630 received from the inverter controller 430, and calculate a speed of the drain motor 630 based on the zero crossing.

The power calculator 521 may calculate a power P supplied to the motor 630, based on the output current idc detected by the output current detector E and the DC terminal voltage Vdc detected by the DC terminal voltage detector B.

The power controller 523 may generate a speed command value $\omega^*r$ based on the power P calculated by the power calculator 521 and a preset power command value $P^*r$.

For example, the power controller 523 may generate the speed command value $\omega^*r$, while a PI controller 525 performs PI control, based on a difference between the calculated power P and the power command value $P^*r$.

Meanwhile, the speed controller 540 may generate a voltage command value Sn, based on the speed calculated by the speed calculator 520 and the speed command value $\omega^*r$ generated by the power controller 523.

Specifically, the speed controller 540 may generate the voltage command value Sn, while a PI controller 544 performs PI control, based on a difference between the calculated speed and the speed command value $\omega^*r$.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, the main controller 210 according to the embodiment of the present disclosure may control such that, during drainage, the motor 630 is driven with first power in case in which the lift, which is the difference between the level of water in a water introduction part introduced into the pump 141 and the level of water in a water discharge part discharged from the pump 141, is at a first level, and the motor 630 is driven with first power in case in which the lift is at a second level which is higher than the first level. Accordingly, water lifting can be done smoothly even in case in which the lift varies during drainage.

Particularly, since the power control allows for driving at constant power, the converter 410 supplies constant power, thereby improving the stability of the converter 410.

Meanwhile, the main controller 210 according to the embodiment of the present disclosure may control the speed of the motor 630 to be constant, in case in which the power supplied to the motor 630 reaches the first power. In this manner, the power control allows for minimizing a decrease in drainage performance according to installation conditions.

Meanwhile, the main controller 210 according to the embodiment of the present disclosure may control such that, when the speed of the motor 630 increases, a period in which the speed of the motor 630 increases includes an initial increase period and a second increase period in which the speed of the motor 630 increases more sluggishly than in the initial increase period. Particularly, it may control the output current idc to be constant during the second increase period. Accordingly, the motor 630 may operate at constant power.

Meanwhile, the main controller 210 according to the embodiment of the present disclosure may control such that, during drainage, the speed of the motor 630 increases as the level of the lift increases.

Meanwhile, the main controller 210 according to the embodiment of the present disclosure may control such that, during drainage, the amount of water lifted by the operation of the drain pump 141 decreases as the level of the lift increases.

Meanwhile, the main controller 210 according to the embodiment of the present disclosure may control such that, during drainage, the speed of the motor 630 increases as the level of water in the washing tub 120 decreases.

Meanwhile, the main controller 210 according to the embodiment of the present disclosure may control such that the reduction in the amount of water lifted by the operation of the drain pump 141 caused by the increase in the level of the lift is smaller in the power control of the motor 630 than in the speed control of the motor 630. Accordingly, the level of the lift that can be installed becomes higher as compared to the speed control, thereby increasing the degree of freedom of installation.

Meanwhile, during drainage, the main controller 210 according to the embodiment of the present disclosure may control the power supplied to the drain motor 630 to be constant without decreasing over time. Accordingly, the drainage time may be reduced.

Meanwhile, the main controller 210 according to the embodiment of the present disclosure may perform power control on the drain motor 630 at the start of drainage, and, when the remainder of the water is reached, may finish the power control. Accordingly, drainage operation may be performed efficiently.

The main controller 210 according to an embodiment of the present disclosure may control the voltage command value Sn and a duty of the switching control signal Sic to be greater as the output current idc is at a smaller level. Accordingly, the motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may control such that, during drainage, the speed of the drain motor 630 increases in case in which the power supplied to the motor 630 does not reach the first power and the speed of the drain motor 630 decreases in case in which the power supplied to the motor 630 exceeds the first power. Accordingly, since the power control allows for driving at constant power, the converter supplies constant power, thereby improving the stability of the converter. Also, the power control allows for minimizing a decrease in drainage performance according to installation conditions.

Meanwhile, the main controller 210 according to another embodiment of the present disclosure may control the speed of the motor 630 to be constant, in case in which the power supplied to the motor 630 reaches the first power. In this manner, the power control allows for minimizing a decrease in drainage performance according to installation conditions.

Meanwhile, the main controller 210 according to another embodiment of the present disclosure may control such that, during drainage, the speed of the motor 630 increases as the level of the lift, which is the difference between the level of water in a water introduction part introduced into the drain pump 141 and the level of water in a water discharge part discharged from the drain pump 141, increases. Accordingly, water lifting can be done smoothly even in case in which the lift varies during drainage. Particularly, the power control allows for minimizing a decrease in drainage performance according to installation conditions.

Meanwhile, the main controller 210 according to another embodiment of the present disclosure may control such that, during drainage, the speed of the motor 630 increases as the level of water in the washing tub 120 decreases. Accordingly, water lifting can be done smoothly even in case in which the lift varies during drainage.

Figure 7:
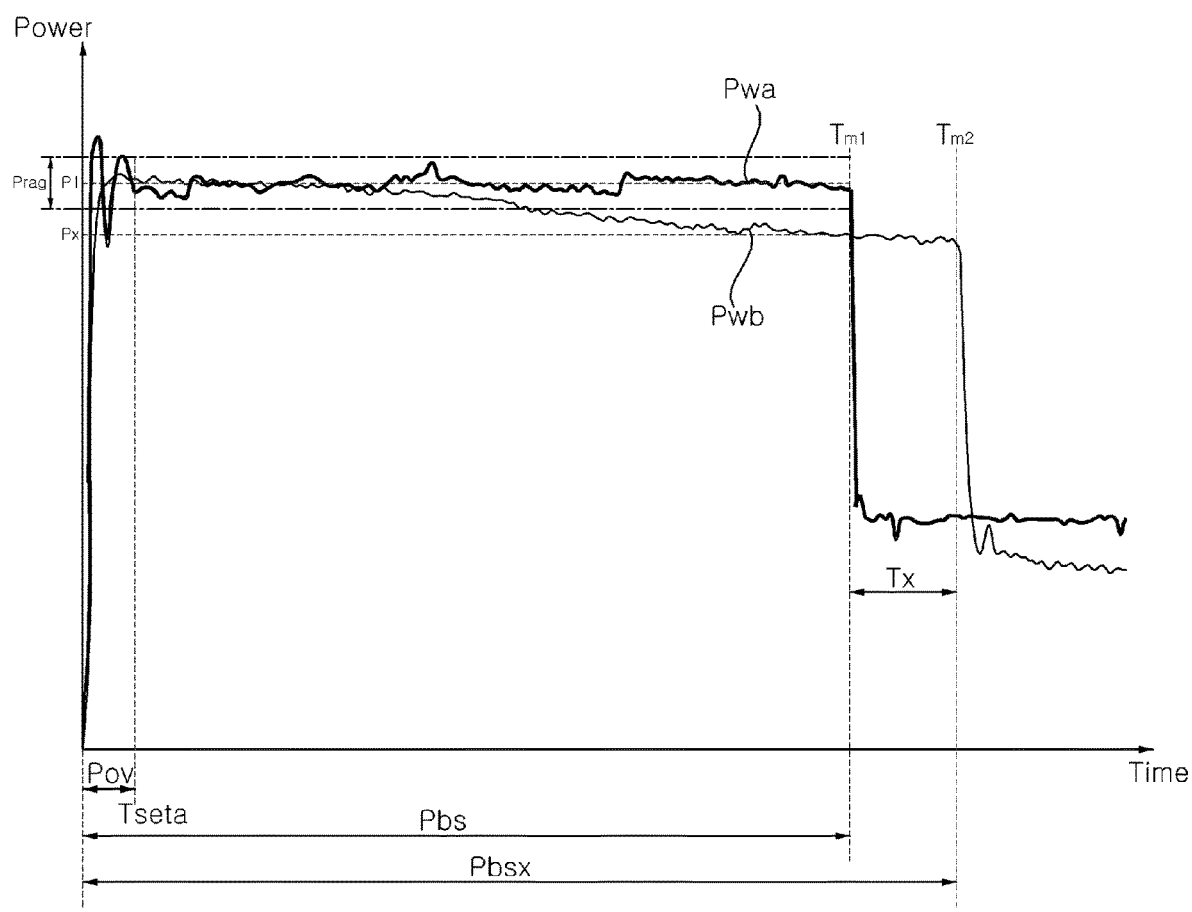
FIG. 7 is a view referred to in the description of a method for operating a pump driving apparatus.

FIG. 7 is a view showing power supplied to a motor according to power control and speed control.

When the power control is performed as in the embodiments of the present disclosure, a time-dependent waveform of the power supplied to the motor 630 may be exemplified as Pwa.

FIG. 7 illustrates that the power is maintained in a substantially constant manner until the time point Tm1 by performing the power control, and the power control is terminated at the time point Tm1.

By performing the power control, the main controller 210 may control the power supplied to the motor 630, during the drainage, to be constant without decreasing over time, although the water level in the washing tub 120 decreases.

During the drainage, by performing the power control, the main controller 210 may control the power supplied to the motor 630 to be the first power P1.

In particular, even in case in which the lift is changed, the main controller 210 may control the power supplied to the motor 630, during the drainage, to be the constant first power P1, by performing the power control.

At this time, the constant first power P1 may mean that the motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the motor 630 is driven with a power within the first allowable range Prag based on the first power P1 from the time point Tseta until the time point Tm1 when the drainage is completed, except for an overshooting period Pov. Accordingly, water pumping can be performed smoothly even in case in which the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a first level, the main controller 210 may control the motor 630 to be driven with a power within the first allowable range Prag based on the first power P1, without decreasing over time, from the first time point Tseta after the drainage is started until the time point Tm1 when the drainage is completed, and when the lift is at a second level, the main controller 210 may control the motor 630 to be driven with a power within the first allowable range Prag based on the first power P1, without decreasing over time, from the first time point Tseta until the time point Tm1 when the drainage is completed.

To this end, when the power control is performed during the drainage, the main controller 210 may calculate a power based on the output current idc and the DC terminal voltage Vdc and output a voltage command value Sn based on the calculated power, and the inverter controller 430 may output a switching control signal Sic to the motor 630 based on the voltage command value Sn.

Meanwhile, the main controller 210 may control the voltage command value Sn and a duty of the switching control signal Sic to be greater as the output current idc is at a smaller level. Accordingly, the motor 630 can be driven with a constant power.

Meanwhile, the main controller 210 may control the speed of the motor 630 to increase as the level of the lift increases. Accordingly, water lifting can be done smoothly even in case in which the lift varies during drainage. Particularly, the power control allows for minimizing a decrease in drainage performance according to installation conditions.

Meanwhile, the main controller 210 may control such that, during drainage, the speed of the motor 630 increases as the level of water in the washing tub 120 decreases. Accordingly, water lifting can be done smoothly even in case in which the lift varies during drainage.

Unlike the embodiments of the present disclosure, when the speed control is performed, that is, when the speed of the drain motor 630 is controlled to be maintained constantly, a time-dependent waveform of the power supplied to the motor 630 may be exemplified as Pwb.

In the drawing, it is illustrated that the speed control is performed until the time point Tm2, and the speed control is terminated at the time point Tm2.

The waveform Pwb of the power based on the speed control indicates that the power supplied to the motor 630 may be gradually reduced, while the speed of the motor 630 is constant, as the water level in the washing tub decreases during the drainage.

In FIG. 7, it is illustrated that, during a speed control period Pbsx, the power supplied to the motor 630 is gradually reduced up to approximately Px at the time point Tm2 when the drainage is completed.

Accordingly, the time when the operation of the motor 630 is terminated in a case where the speed control is performed is Tm2, which is delayed approximately by the period Tx, when compared to that in a case where the power control is performed.

Consequently, according to the embodiment of the present disclosure, the drainage time is reduced approximately by the period Tx when power control is performed, as compared to when speed control is performed. Moreover, the power supplied from the converter 410 may be kept constant, thereby improving the operational stability of the converter 410.

Meanwhile, the operations of the pump driving apparatus and pump motor according to the present disclosure may apply equally to the circulation pump and the circulation motor, as well as the drain pump and the drain motor.

The drain pump driving apparatus 620 according to the embodiment of the present disclosure may be applied to various machines such as dishwashers and air conditioners, in addition to the laundry treatment machine 100 and 100b.

Figure 8A:
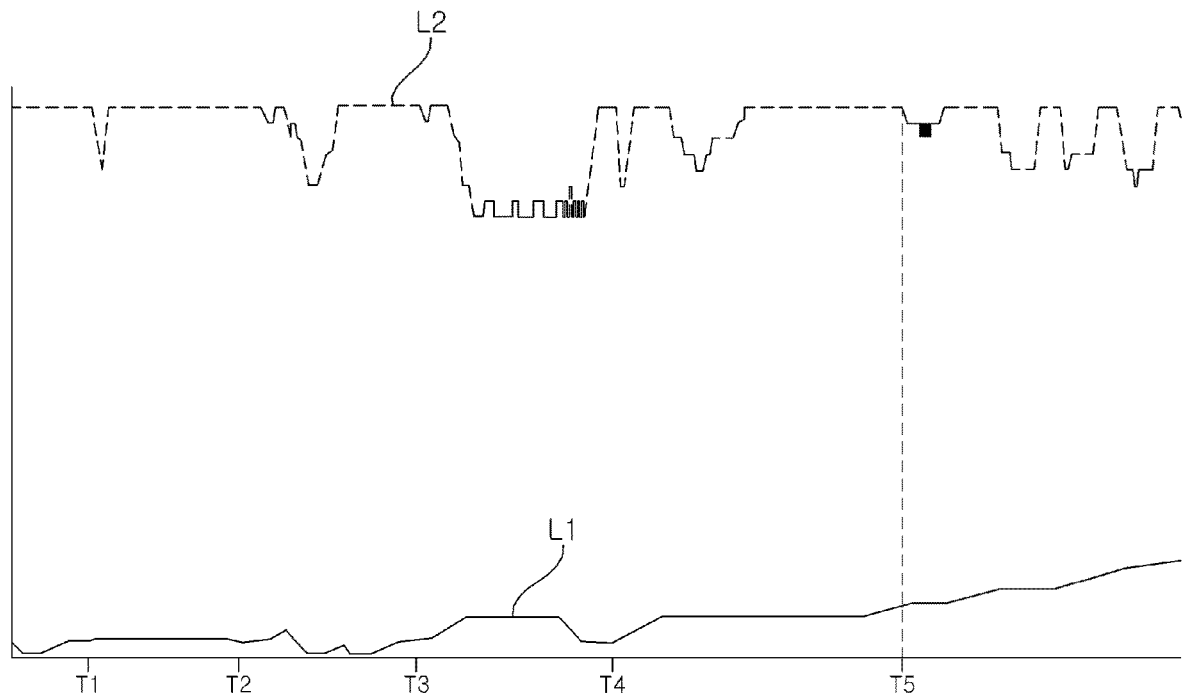
FIG. 8A is a view illustrating changes in water level with respect to speed of rotation of the main motor of a laundry treatment machine according to an embodiment of the present disclosure.
Figure 8B:
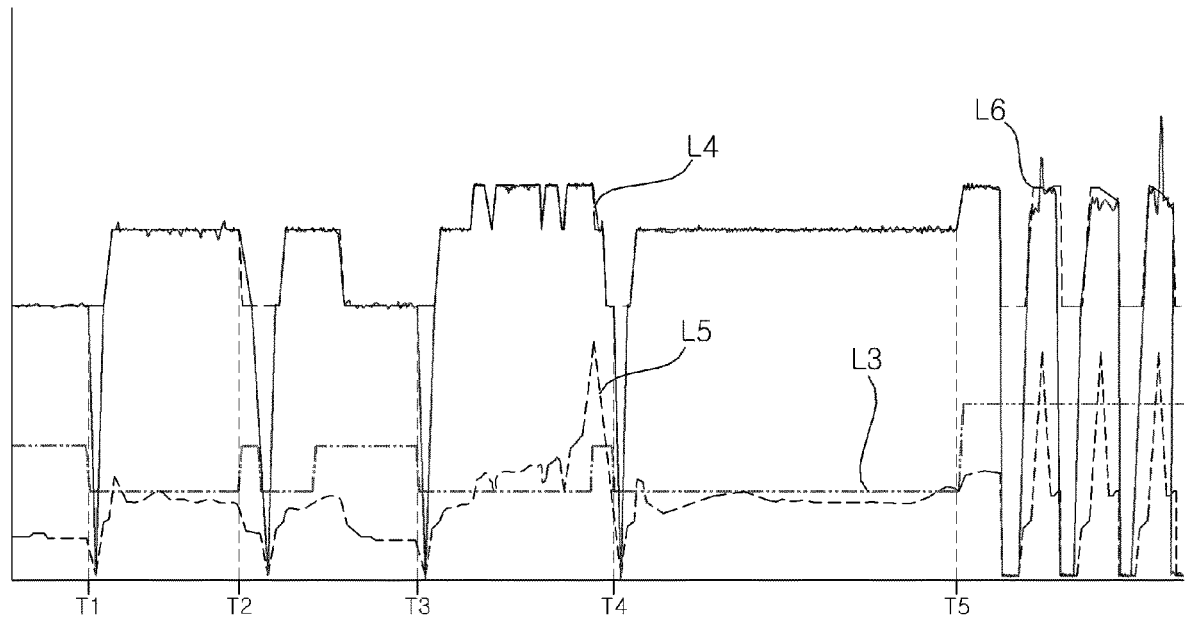
FIG. 8B is a view referred to in the description of changes in speed and changes in current of a drain pump with respect to the speed of rotation of the main motor of FIG. 8A.

FIG. 8A is a view illustrating changes in water level with respect to speed of rotation of the main motor of a laundry treatment machine according to an embodiment of the present disclosure. FIG. 8B is a view referred to in the description of changes in speed and changes in current of a drain pump with respect to the speed of rotation of the main motor of FIG. 8A.

Referring to FIG. 8A, the first graph L1 is a graph showing the speed of rotation of the main motor, and the second graph is a graph showing the corresponding water level L2. The water level is a value inputted from a sensor, and the smaller the value of the water level, the higher the water level, and the greater the value of the water level, the lower the water level.

Referring to FIG. 8B, the third graph L3 shows the mode of the drain pump, the fourth graph L4 shows the speed of rotation of the drain motor provided in the drain pump, and the fifth graph L5 is a current value of the drain motor.

The main motor is operated by a driver based on a washing stroke, and spins the washing tub. The driver 220 operates in response to a control command from the main controller 210.

The laundry treatment machine repeats the operation of supplying wash water to the washing tub, draining it, and performing dewatering while a washing stroke, a rinsing stroke, and a dewatering stroke are performed.

The dewatering may be performed during the rinsing stroke and the dewatering stroke, respectively, after completion of the washing stroke.

The main controller allows the drain pump to operate by applying a control signal to the pump driving apparatus, while performing dewatering by rotating the main motor 230, thereby draining the wash water released from the laundry during the dewatering operation.

The main controller controls the drain pump during drainage in response to the water level and the speed of rotation of the main motor. The main controller applies a control signal to the drain pump driving apparatus, and the drain pump driving apparatus starts up the drain motor in response to the control signal. The drain pump is operated by starting up the drain motor, thereby draining wash water.

Upon completion of a stroke, the main controller applies a control signal to the drain pump driving apparatus to keep the drain pump operating to drain the wash water.

As shown in FIGS. 8A and 8B, when the speed of the main motor increases, the wash water contained in the laundry is released by the spinning of the washing tub, thereby increasing the water level.

In case in which the main motor operates during dewatering, the drain pump also operate and therefore the wash water released from the laundry is drained by the drain pump.

When the speed of the main moto increases, the level of wash water also increases. However, it can be seen that the increased amount of wash water is not drained immediately but remains within the washing tub, with its water level being maintained without decreasing. The wash water also increases while the speed of the main motor increases and is maintained from the third time T3 to the fourth time T4. The increased amount of wash water is maintained without being drained.

From the third time T3 to the fourth time T4, the drain motor of the drain pump increases in response to the operation of the main motor, and the level of wash water does not decrease but the current of the drain motor increases. That is, although the speed of rotation of the drain motor increases while the main motor is speeding up, the level of wash water is maintained without decreasing, which keeps the released wash water from being drained.

Although the speed of rotation of the drain motor increases with the increased water level, the wash water remains except only part of it being drained, and this causes idling of the drain pump, thus generating noise.

In case in which the speed of the drain motor decreases and then increases again at the fourth time T4, wash water is introduced into the drain motor, thereby decreasing the level of wash water.

Meanwhile, the mode of the drain pump is changed based on the speed of the main motor and the water level.

A target speed of rotation of the drain motor is set according to the mode of the drain pump, and the drain motor operates while changing the speed of rotation. The main controller divides the operation of the main motor into a period (low-speed period from T1 to T2) in which the main motor operates at a set speed or below, that is, a first speed or below, a period (speed-up period) in which the main motor speeds up within the range of first to second speeds, and a period (high-speed period) T % in which the main motor rotates at a high speed above the second speed, based on the speed of rotation of the main motor during dewatering, and sets the drain pump to operate at different modes for the different periods. For example, the first speed may be set to 100 to 150 rpm, and the second speed may be set to 400 to 450 rpm.

In this case, the speed may be based on the speed of rotation of the washing tub. In case in which the speed increases to the second speed or above, it may be classified as high-speed dewatering.

The drain pump may be set to a second mode M2 in which the drain motor maintains the ON state while the main motor is speeding up, a first mode M1 in which the speed of the drain motor varies with the water level in case in which the main motor is operating in the low-speed period at the first speed or below, and a third mode M3 in which the main motor operates for a set period of time during high-speed dewatering.

The pump driving apparatus may repeatedly decrease or increase the speed of the motor for a set period of time when the level of wash water is increasing. When the pump is operating at high speed, the internal pressure of the pump rises even in case in which the level of wash water has increased, thus making it difficult to allow wash water to enter the pump.

Accordingly, the main controller allows the wash water to enter the pump while the speed of the pump motor is going down, by decreasing the speed of the pump motor and then increasing it again. When the speed is decreased, the wash water is introduced into the pump, and when the speed of the pump motor is increased, the pump drains the introduced wash water through a drain hose.

Figure 9A:
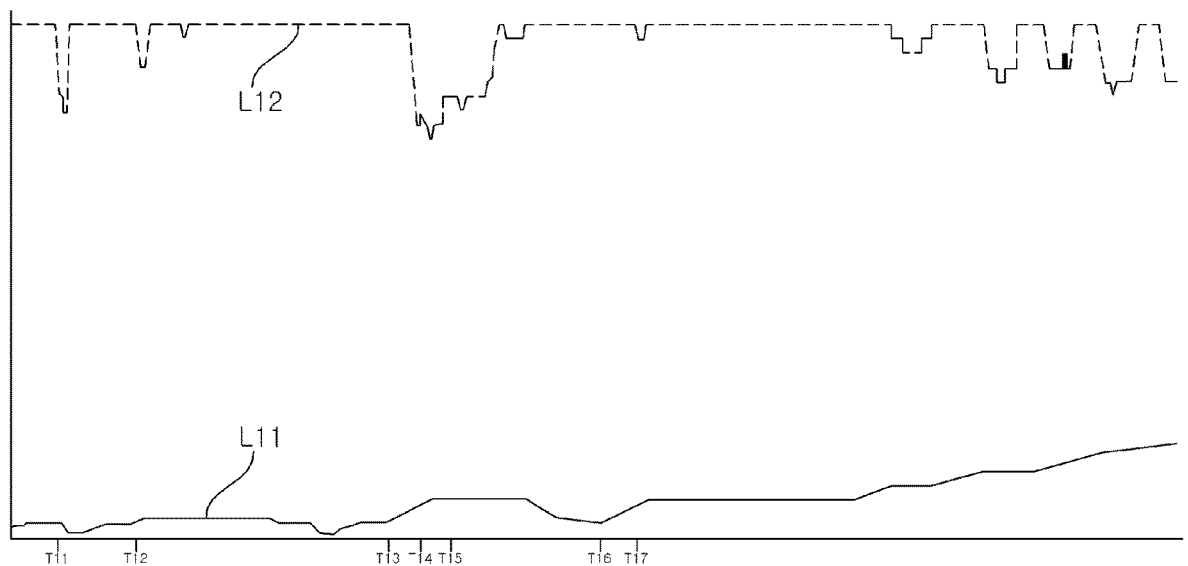
FIG. 9A is a view illustrating changes in water level with respect to speed of rotation of a main motor of a laundry treatment machine according to an embodiment of the present disclosure, when drain pump control is performed.
Figure 9B:
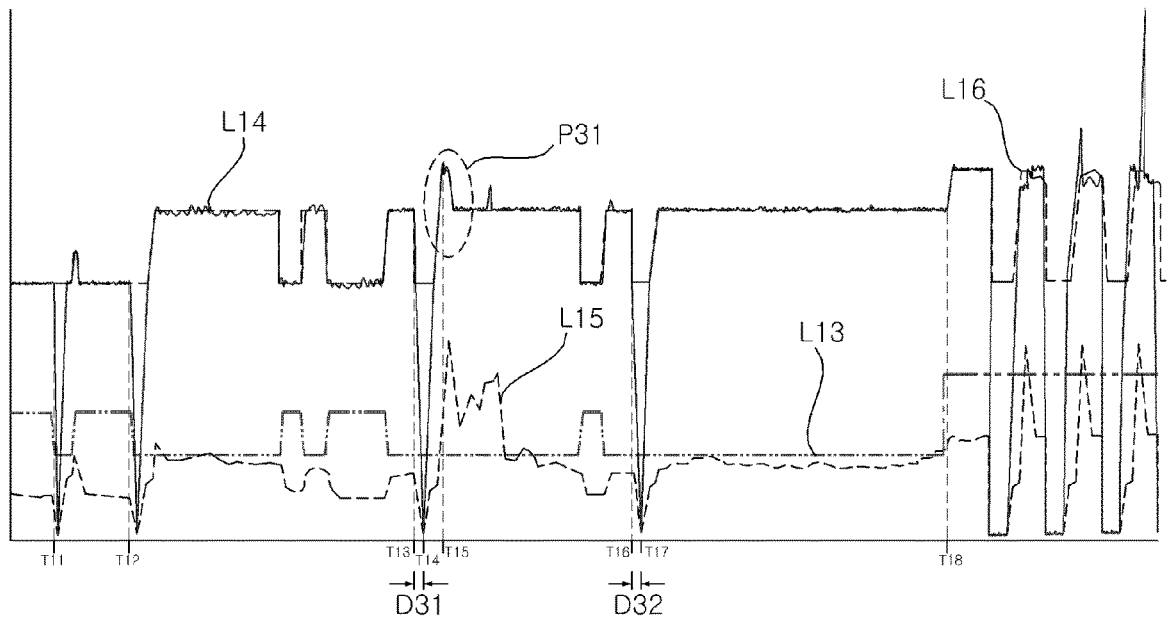
FIG. 9B is a view referred to in the description of changes in speed and changes in current of a drain pump with respect to the speed of rotation of the main motor of FIG. 9A.

FIG. 9A is a view illustrating changes in water level with respect to speed of rotation of a main motor of a laundry treatment machine according to an embodiment of the present disclosure, when drain pump control is performed. FIG. 9B is a view referred to in the description of changes in speed and changes in current of a drain pump with respect to the speed of rotation of the main motor of FIG. 9A.

Referring to FIG. 9A, the eleventh graph L11 is a graph showing the speed of rotation of the main motor, and the twelfth graph is a graph showing the corresponding water level L12. The water level is a value inputted from a sensor, and the smaller the value of the water level, the higher the water level, and the greater the value of the water level, the lower the water level.

Referring to FIG. 9B, the thirteenth graph L13 shows the mode of the drain pump, the fourteenth graph L14 shows the speed of rotation of the drain motor provided in the drain pump, and the fifteenth graph L15 is a current value of the drain motor.

As shown in FIG. 9A and FIG. 9B, the main controller may control the speed of the drain motor to go up or down while the main motor is speeding up.

The speed of the drain motor may decrease and increase again with the speed of the main motor at the eleventh time T11 and the twelfth time T12. At this point, the speed of the drain motor decreases and then increases again with the changing speed of the main motor, regardless of the level of wash water.

The drain motor slows down from the eleventh speed R11 to the tenth speed R10 and then speeds up back to the eleventh speed. Meanwhile, the mode in which the drain motor operates based on the water level is set for the twelfth time, and therefore the speed goes up to the twelfth speed R12.

Moreover, in case in which the main motor speeds up within the range from the first speed to the second speed, the main controller allows the speed of the drain motor to decease and the increase again. The drain pump driving apparatus controls the speed of the drain motor in response to a control command from the main controller.

The drain pump driving apparatus may allow the drain motor to stop for a set period of time and then operate again and increase its speed. Also, the drain pump driving apparatus may allow the drain motor increase its speed after operating at below a determined speed without stopping, when the speed of the drain motor decreases.

Accordingly, the drain motor decreases its speed for a set period of time D31 from the thirteenth time T13 to the fourteenth time T14 and then increases its speed at the fourteenth time. At this point, the drain motor may decrease its speed and stop and then increase its speed.

For example, the set period of time may be set to about 10 seconds. The set period of time is the time taken until the pressure inside the drain pump is decreased and wash water is introduced into the drain pump.

Here, the eleventh speed is the speed of rotation of the drain motor set for the second mode, the eleventh speed and the twelfth speed are the speed of rotation of the drain motor that changes with the water level in the first mode, and the thirteenth speed is the speed of rotation of the drain motor in the third mode in which the drain motor is set to operate for a specified period of time while the main motor is rotating at high speed.

For example, the eleventh speed may be set to 2,300 to 2,500 rpm, the twelfth speed may be set to 2,900 to 3,200 rpm, the thirteenth speed may be set to 3,200 to 3,500 rpm, and the tenth speed may be set to 0 to 500 rpm.

The speed of the drain motor goes down from the twelfth speed R12 to the tenth speed R10 and then goes up again to the twelfth speed R12 after a set period of time and maintains the twelfth speed.

In a case where the main motor speeds up, the wash water contained in the laundry is released and the water level increases. In this case, the drain motor decreases its speed or stops for a set period of time, and therefore the pneumatic pressure in the drain pump decreases, thus causing the wash water to enter the drain pump. As the drain motor operates again, the wash water introduced into the drain pump is drained and the water level decreases.

The main controller may allow the drain motor to further speed up when decreasing the speed of the drain motor and increasing it again to speed up the main motor.

By means of the drain pump driving apparatus, the drain motor decreases its speed at the fifteenth time T15 and then increases its speed after a set amount time, and the speed of rotation may increase P31 by further speeding up the drain motor. The drain motor increases its speed from the tenth speed R10 to the thirteenth speed R13, which is higher than the twelfth speed 13, and maintains the twelfth speed R12.

As the speed of rotation of the drain motor increases, wash water is drained. In case in which the speed of rotation of the drain motor is further increased, the wash water is quickly drained and the water level decreases.

After the speed of the drain motor has increased by speeding up further, the drain pump driving apparatus allows the speed of the drain motor to go down and maintain a determined speed.

For example, the drain motor driving apparatus may control the drain motor to have the eleventh speed or the twelfth speed based on the mode of the drain motor, and, in case in which the main motor speeds up and the water level increases, may decrease the speed of the drain motor to the tenth speed R10 and then increase the speed to the twelfth speed R12.

Moreover, by further speeding up the drain motor, the drain pump driving apparatus may increase the speed up to the thirteenth speed R13 and then decrease it to the twelfth speed R12 and maintain the twelfth speed.

The speed may change among the eleventh to thirteenth speed R11 to R13 based on the mode of the drain motor. Although the tenth speed R10 is illustrated as a speed at which the drain motor is stopped, it may be set to a speed greater than 0 rpm in some cases.

As the drain motor stops operation and then operates again and also speeds up further at the fifteenth time to operate, the current of the drain motor decreases from the thirteenth time to the fourteenth time and then increases again since the drain motor restarts and speeds up. Afterwards, the current is decreased and maintains a constant value.

As the drain pump is temporarily stopped, the pneumatic pressure of the drain pump is decreased and wash water is introduced into the drain pump. The introduced wash water is drained when the drain pump operates, and therefore the increased water level decreases again.

Meanwhile, the drain motor is turned on at the seventeenth time and then operates at a specified speed without further speeding up.

The speed of rotation of the main motor increases from the sixteenth time T16 to the seventeenth time T17, and the speed of the drain motor therefore decreases during a set period of time D32 and then increases again at the seventeenth time. The speed of rotation of the drain motor decreases at the sixteenth time to stop the operation of the drain motor, and the speed may increase again from the seventeenth time.

At this point, the set period of time D31 or D32 for which the speed of the drain motor decreases or the drain motor stops may be set equal, and in some cases, the time may change with the capacity of the laundry treatment machine and the performance of the drain pump.

Meanwhile, the drain motor may decrease the speed of rotation without stopping the operation during the set period of time D31 or D32 and then increase it again. That is, the drain motor may decrease the speed to the minimum speed of rotation without completely stopping the operation so that wash water enters the drain pump, and then may increase the speed again.

Accordingly, the level of wash water increases as the main motor speeds up, and then the wash water is introduced into the drain pump. Since the drain pump operates after a given quantity of wash water or more is introduced into the drain pump, the wash water is drained, leaving no noise generated by idling.

Figure 10:
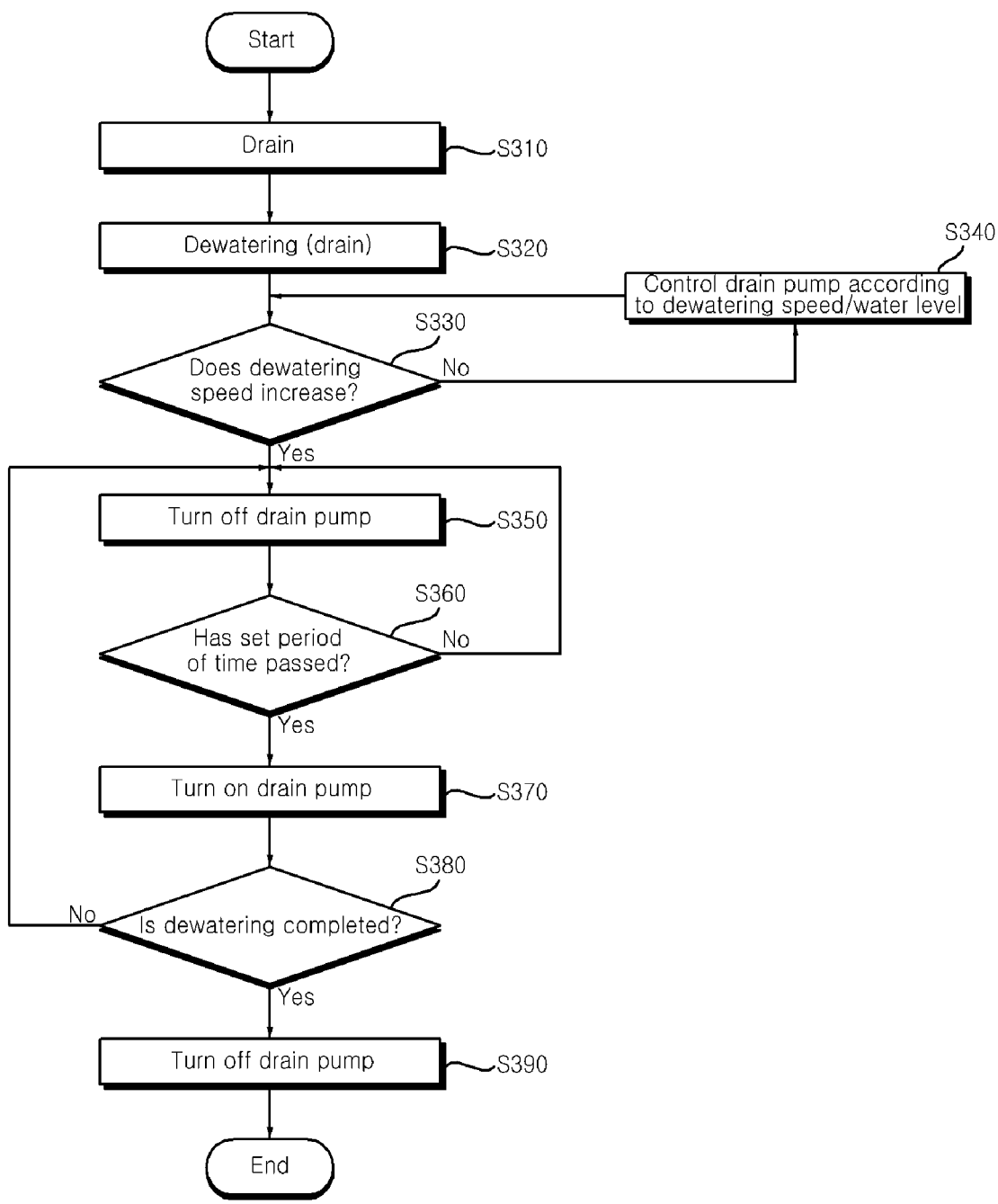
FIG. 10 is a sequential chart illustrating a draining method for a laundry treatment machine according to an embodiment of the present disclosure.

FIG. 10 is a sequential chart illustrating a draining method for a laundry treatment machine according to an embodiment of the present disclosure.

The main motor is operated by a driver based on a washing stroke, and spins the washing tub. The driver 220 operates in response to a control command from the main controller 210.

The laundry treatment machine repeats the operation of supplying wash water to the washing tub, draining it, and performing dewatering while a washing stroke, a rinsing stroke, and a dewatering stroke are performed.

The dewatering may be performed during the rinsing stroke and the dewatering stroke, respectively, after completion of the washing stroke.

The main controller allows the drain pump to operate by applying a control signal to the pump driving apparatus, while performing dewatering by rotating the main motor 230, thereby draining the wash water released from the laundry during the dewatering operation.

Referring to FIG. 10, upon completion of a stroke, the main controller applies a control signal to the drain pump driving apparatus to keep the drain pump operating to drain the wash water (S310).

Once the wash water is drained by the operation of the drain pump while the main motor is stopped, the main motor is operated and performs dewatering to release and drain the wash water contained in the laundry (S320).

During dewatering, the drain pump driving apparatus 620 controls the on and off operations and speed of the drain pump in response to a control command from the main controller. The drain pump driving apparatus controls the drain motor, and the drain pump drains wash water.

Since the quantity of wash water contained in the laundry is large in the initial period of the dewatering, an increase in the speed of rotation of the main motor allows the wash water contained in the laundry to be released, thus increasing the water level.

In case in which the speed of dewatering increases (S330), that is, it is decided that the main motor is not speeding up to increase its speed to a determined speed or above within a predetermined period of time, the drain pump driving apparatus operates the drain pump based on the dewatering speed and the water level (S340).

In case in which the main motor is speeding up, the drain pump driving apparatus stops the drain motor to stop the drain pump (S350). The drain motor decreases its speed and stops in response to a stop command.

The drain pump driving apparatus allows the drain pump to stop operation for a set period of time (S360), and controls the drain motor so that the drain pump operates again (S370).

At this point, since the drain pump stops operation, the pneumatic pressure formed when the drain motor rotates at high speed is reduced, and therefore wash water is introduced into the drain pump.

Once the drain motor is operated, the pump driving apparatus increases the target speed to operate the drain motor. Accordingly, wash water is drained by the drain pump.

As wash water is introduced while the drain pump is stopped, the wash water is drained without introduction of air in case in which the drain pump resumes operation, thereby preventing idling. Also, the drain pump generates no noise caused by idling.

The drain pump driving apparatus repeats the above operation until completion of dewatering and drainage (S330 to S380).

Upon completion of dewatering and drainage, the drain pump driving apparatus stops the drain motor, and the drain pump therefore stops operation (S390).

In a low-speed mode, the wash water contained in the laundry is released at the initial speed of release, and the water level varies based on the quantity of wash water released.

In case in which the drain motor operates at high speed while the water level is low, water drainage is attempted while only part of the wash water is introduced into the drain pump, thus increasing the possibility of idling. Accordingly, in case in which the water level is low, the speed of the drain motor is decreased so that some quantity of wash water is introduced into the drain pump.

Figure 11:
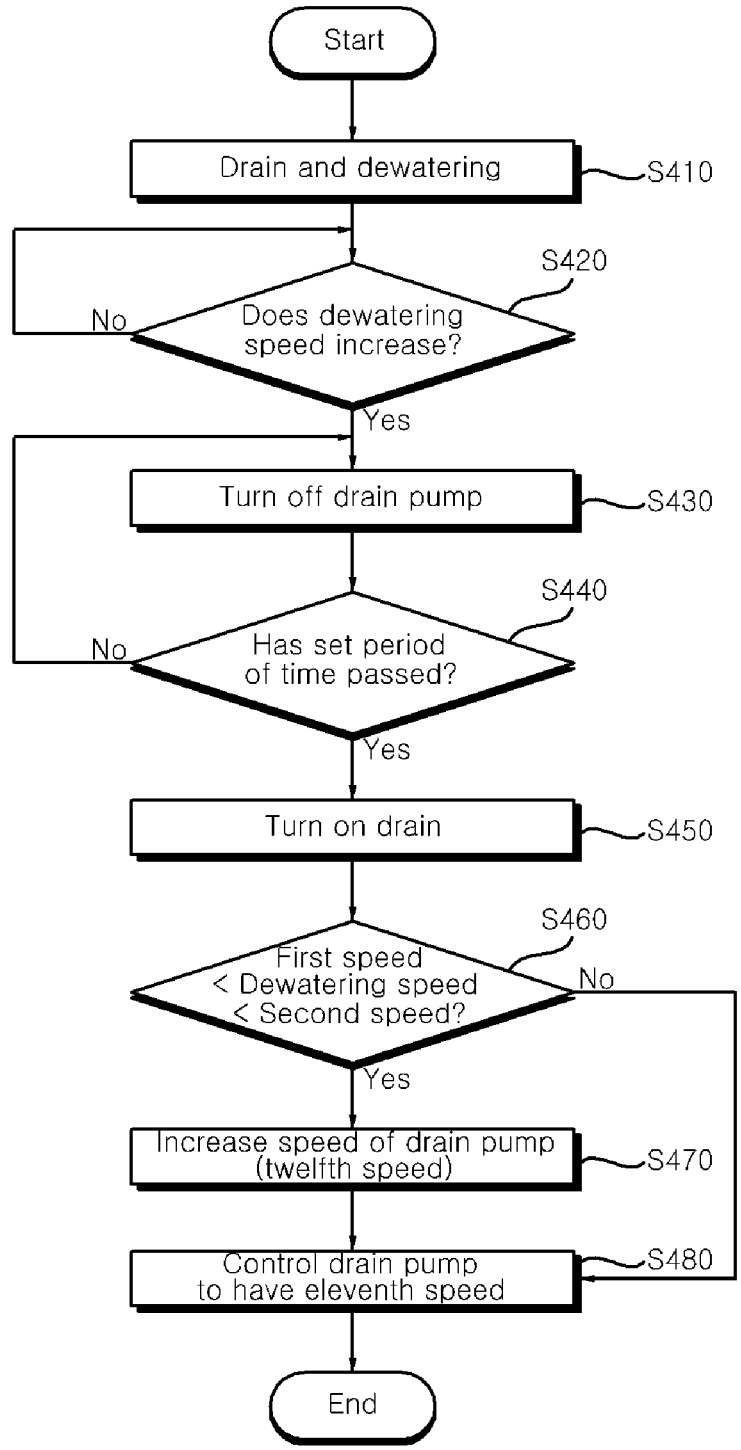
FIG. 11 is a sequential chart illustrating a method for controlling a drain pump according to an embodiment of the present disclosure.

FIG. 11 is a sequential chart illustrating a method for controlling a drain pump according to an embodiment of the present disclosure.

Referring to FIG. 11, the drain pump is operated while dewatering is being performed by the operation of the main motor, thereby draining released wash water (S410).

Once the dewatering speed of the main motor increases (S420), the main controller controls the drain pump driving apparatus so that the drain pump slows down or stops for a set period of time. The drain pump driving apparatus stops the drain motor to turn off the drain pump (S430).

The drain motor decreases its speed in response to an operation stop command and therefore stops operation. The drain pump driving apparatus counts the number of times the drain motor is stopped, and stops it for a set period of time or longer (S440).

The main controller increases the speed of the drain motor and then increases it again for a set period of time. After the lapse of the set period of time, the drain pump driving apparatus restarts the drain motor in response to a control command from the main controller to operate the drain pump (S450).

The drain pump driving apparatus controls the drain motor to increase its speed. The drain pump drains the wash water introduced into the drain pump and the wash water within the washing tub by the operation of the drain motor.

Meanwhile, in case in which the speed of the drain motor is increased, the drain motor may be controlled so that the speed of rotation is changed based on the current dewatering speed (rotation speed) of the main motor.

In case in which the speed of rotation of the main motor is equal to or higher than a first speed and lower than a second speed (S460), the main controller increases the speed of the drain motor to a preset speed (S470). Also, the pump driving apparatus further increases the speed of the drain motor to a speed greater than a preset speed, and then decreases it again and maintain the preset speed (S480 and S500).

For example, the pump driving apparatus further increases the speed of the drain motor to a thirteenth speed R13 higher than a twelfth speed R12 and then decreases it to the twelfth speed R12 again and maintains it.

The pump driving apparatus controls the on and off operations of the drain pump while the main motor is speeding up, and, when the drain pump is operated again, the drain motor may speed up only a set number of times. For example, the drain motor may speed up further only once in the initial stage within the corresponding speed range.

In case in which the speed of rotation of the main motor is lower than a first speed or equal to or higher than a second speed, the main controller increases the decreased speed of the drain motor (S490). The drain pump driving apparatus allows the drain motor to increase its speed up to the twelfth speed and the maintain the twelfth speed without speeding up further (S500). Also, the main controller increases the speed of the drain motor without speeding it up when the set number of times is exceeded.

In case in which the speed of the main motor increases to a determined speed or above, that is, the second speed or above, the amount of moisture contained in the laundry is decreased. Thus, the level of wash water is not increased greatly by the operation of the main motor, and therefore there is no need to further speed up the drain motor.

Moreover, in case in which the speed of the main motor is lower than a predetermined speed, for example, lower than a first speed, the amount of dewatering by the rotation of the main motor is small. Thus, it is desirable to further speed up the drain motor when the main motor is between the first speed and the third speed.

The wash water released from the laundry by speeding up the main motor is introduced into the drain pump while the drain pump is stopped, thereby draining the wash water at the start-up of the drain pump.

Once the dewatering stroke is started, the quantity of wash water contained in the laundry is large. Thus, a large amount of wash water is released from the laundry by speeding up the main motor as above while increasing the speed of the drain motor. Accordingly, the drain pump is able to drain the wash water without idling, and effectively drain the increased amount of wash water by dewatering.

The laundry treatment machine according to embodiments of the present disclosure are not limited to the configurations and methods of the above-described embodiments, and various modifications to the embodiments may be made by selectively combining all or some of the embodiments.

Meanwhile, a method for operating a drain pump driving apparatus and a laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A laundry treatment machine comprising:
a washing tub;
a main motor configured to supply torque to the washing tub;
a pump;
a pump motor configured to operate the pump;
a pump driving apparatus configured to drive the pump motor; and
a main controller configured to control the pump driving apparatus to operate the pump based on changes in speed of the main motor during dewatering,
wherein, when the main motor speeds up to be within a range between a first speed and a second speed greater than the first speed, the main controller is configured to control the pump motor to decrease the speed for a set period of time, to increase the speed from a third speed to a fourth speed greater than the third speed after the decrease of the speed for the set period of time, and to maintain the third speed after the increase of the speed from the third speed to the fourth speed.

2. The laundry treatment machine of claim 1, wherein, when the main motor speeds up, the main controller controls the pump motor to operate again after stopping the pump motor, and then to increase the speed.

3. The laundry treatment machine of claim 1, wherein the wash water is released from laundry while the main motor speeds up and is introduced while the speed of the pump motor decreases, and the pump drains the wash water while the pump motor speeds up.

4. The laundry treatment machine of claim 1, wherein the main controller controls the pump motor to decrease speed of the pump motor for a preset period from time.

5. The laundry treatment machine of claim 1, wherein, when the main motor speeds up to a speed greater than the second speed, the main controller controls the pump motor to decrease the speed for a set period of time, and to increase the speed after the decrease of the speed for the set period of time.

6. The laundry treatment machine of claim 5, wherein the third speed of the pump motor when the main motor speeds up to be within the range between the first speed and the second speed is lower than the speed of the pump motor when the main motor speeds up to a speed greater than the second speed.

7. The laundry treatment machine of claim 1, wherein the pump driving apparatus counts the number of times the pump motor speeds up to the fourth speed, and when the count reaches a specified number of times, the main controller controls the pump motor to maintain the third speed.

8. The laundry treatment machine of claim 1, wherein the main controller sets the speed of the pump motor based on the speed of the main motor and a water level.

9. A method for controlling a laundry treatment machine, the method comprising:
draining wash water by a pump by driving a pump motor;
dewatering the wash water contained in laundry by rotating a main motor;
in case the main motor speeds up to be within a range between a first speed and a second speed greater than the first speed during the dewatering, decreasing the speed of the pump motor;
increasing the speed from a third speed to a fourth speed greater than the third speed by speeding up the pump motor after the decreasing of the speed of the pump motor; and
maintaining the third speed.

10. The method of claim 9, wherein, when the main motor speeds up, the speed of the pump motor decreases for a preset period of time.

11. The method of claim 9, further comprising stopping the pump motor by decreasing the speed of the pump motor.

12. The method of claim 9,
wherein, when the main motor speeds up to a speed greater than the second speed, controlling the pump motor to decrease the speed for a set period of time, and to increase the speed after the decreasing of the speed for the set period of time.

13. The method of claim 12, further comprising:
counting the number of times the pump motor speeds up to the fourth speed, and when the count reaches a specified number of times, maintaining the speed of the pump motor at the third speed.

14. The method of claim 12, wherein the third speed of the pump motor when the main motor speeds up to be within the range between the first speed and the second speed is lower than the speed of the pump motor when the main motor speeds up to a speed greater than the second speed.

15. The method of claim 9, wherein the speed of the pump motor is set based on the speed of the main motor and a water level.

* * * * *